May 27, 1969 D. P. KNAPP 3,446,506

PHONOGRAPH CABINET

Filed June 17, 1966 Sheet 1 of 2

INVENTOR
DONALD P. KNAPP

BY Mueller, Aichele & Rauner

ATTORNEYS

INVENTOR
DONALD P. KNAPP
BY Mueller, Aichele & Rauner
ATTORNEYS

United States Patent Office 3,446,506
Patented May 27, 1969

3,446,506

PHONOGRAPH CABINET

Donald P. Knapp, Des Plaines, Ill., assignor to Motorola, Inc., Franklin Park, Ill., a corporation of Illinois Filed June 17, 1966, Ser. No. 558,392
Int. Cl. G11b *1/02*
U.S. Cl. 274—2 3 Claims

ABSTRACT OF THE DISCLOSURE

Support posts extend from the bottom of a tray for housing a chassis of a phonograph turntable and record changer. Springs are connected to the bottom of the chassis and engage the support posts to suspend the chassis in a floating condition. Lips mounted to the top of the support posts prevent movement of the springs when the record turntable is moved from the horizontal to vertical position within the cabinet. A further pair of posts each having a top mounting portion extend from the bottom of the tray and threaded fasteners extend through the chassis and apertures in the top mounting portions of the posts. Spring clips are threaded to the fasteners and are moved from a vertical to a horizontal position to engage the bottom of the upper support portion to lock the chassis in position.

This invention relates to phonograph record players and more particularly to a simplified assembly for mounting a record turntable in an enclosing tray or drawer.

A motor driven turntable for a phonograph record player is generally constructed as a sub-assembly on a chassis or panel including a tone arm and pickup, together with the mechanism for driving a turntable at the proper record playing speeds and automatically changing and playing a stack of records. Such a chassis should be spring supported or "floated" to reduce adverse effects of vibration as the phonograph pickup needle travels in the record groove. When a phonograph player is to be shipped or otherwise transported, it is common to secure the changer chassis in fixed position against its spring mounting to reduce the chance of damage through jolting of the mechanism in transit.

These considerations are particularly important in the case of a portable phonograph player. However, in portable players, and certain other types of players, the changer chassis must be secured in a movable tray or drawer which is exposed to view on several sides in its different positions. This can limit the possibility of incorporating the usual fastening techniques to "float" the changer for proper record playing, while at the same time maintaining it in position during movement of the tray and permitting assembly and disassembly of the chassis in a structure which maintains an attractive appearance.

An object of this invention is to provide a simple and economic tray or drawer for removably holding a record turntable chassis.

Another object is to provide a molded plastic tray for spring supporting a record changer in position for use and retaining it in position with the tray tilted for storage purposes.

A further object is to provide a tray or drawer for a phonograph turntable and record changer which has relatively few pieces to be separated in disassembly of the device for service, while at the same time having a simple and improved fastening means for securing the tray and changer without exposing such fastening means exterior of the tray.

In particular form of the invention a molded plastic tray for housing a phonograph turntable and changer is provided in a pivotally mounted structure so that the turntable can be positioned horizontally for use and then moved to a vertical position for storage. Integral supporting posts are disposed within the tray and extend upwardly from its bottom. Three of these posts are constructed to engage and retain shock mounting coil springs which bear against the lower side of the record changer chassis to support it in a floated condition. A further pair of the posts include top portions which are apertured to receive fasteners for locking the changer chassis during storage or shipment and also for retaining the chassis against removal when the device is retained in its spring mounted condition. To this end threaded fasteners extend through the changer chassis and into apertures of these latter two posts. Clips on the ends of the threaded fasteners enable these to be tightened to draw the changer chassis against the posts and against the coil springs for securing the changer. By adjusting the threaded fasteners to a released condition, the clips supported on them disengage the post to permit floating of the changer. The threaded fasteners which extend into the apertures of the support posts, together with the engagement of the coil springs and their associated support posts prevent shifting of the changer mechanism when the tray is pivoted for storage purposes.

Figure 1:
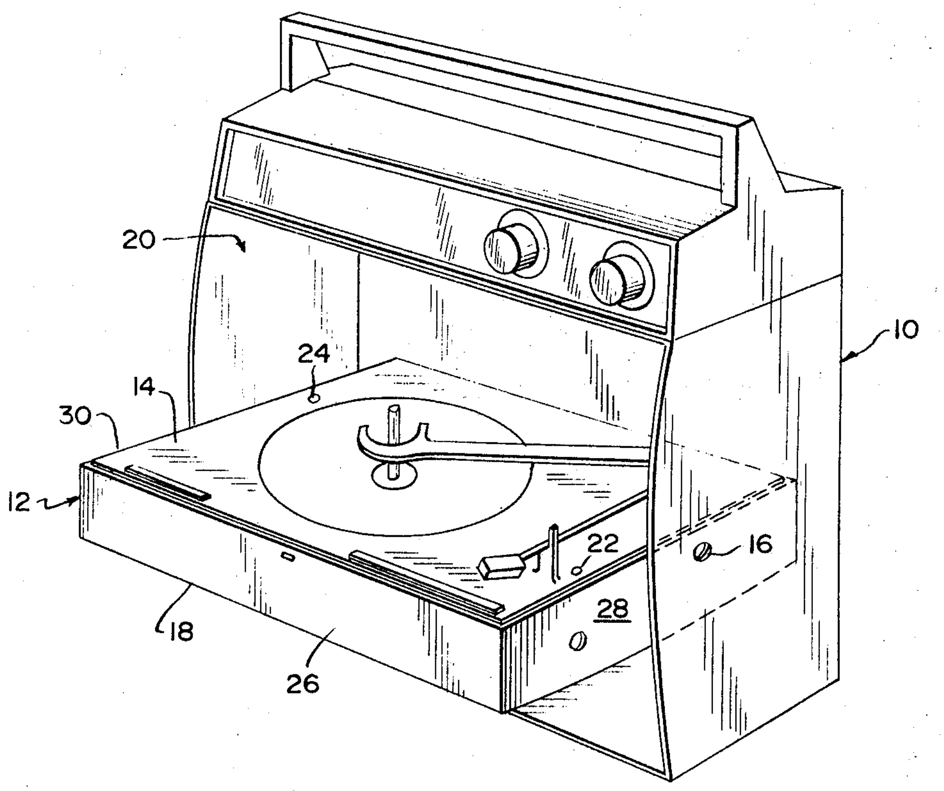
FIG. 1 shows a portable record player with the tray housing the turntable pivotally mounted within a cabinet.

The portable record player of FIG. 1 includes chassis 14 comprising a motor driven turntable, a tone arm, a pickup and automatic changer mounted in a tray or drawer 12. The tray 12 is attached to cabinet 10 by the pivot pin 16 (another pivot pin on the opposite side is not shown) which allows the record changer to be tilted to a vertical position for storage so that bottom face 18 of tray 12 provides a flush closure of opening 20 in cabinet 10. In operation, the record changer is tilted down into a horizontal position as shown. Chassis 14 is mounted onto tray 12 by means of threaded fasteners 22 and 24, the detail of which will be explained subsequently. The prior record players generally have large access openings on the bottom of the record changer housing in order to lock the fastening devices. However, it will be noted that in a portable unit such as that shown, front face 26, sides 28 and 30, and bottom face 18 are exposed to view so that any openings to facilitate mounting would mar the appearance of the entire unit.

Figure 4:
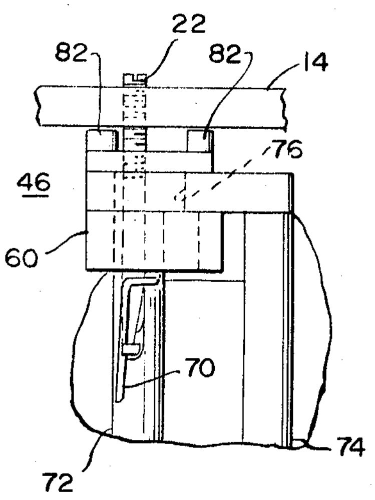
FIG. 4 is a fragmentary vertical section of one of the mounting assemblies in FIG. 3 showing additionally the fastening clip in its vertical position for removal.
Figure 2:
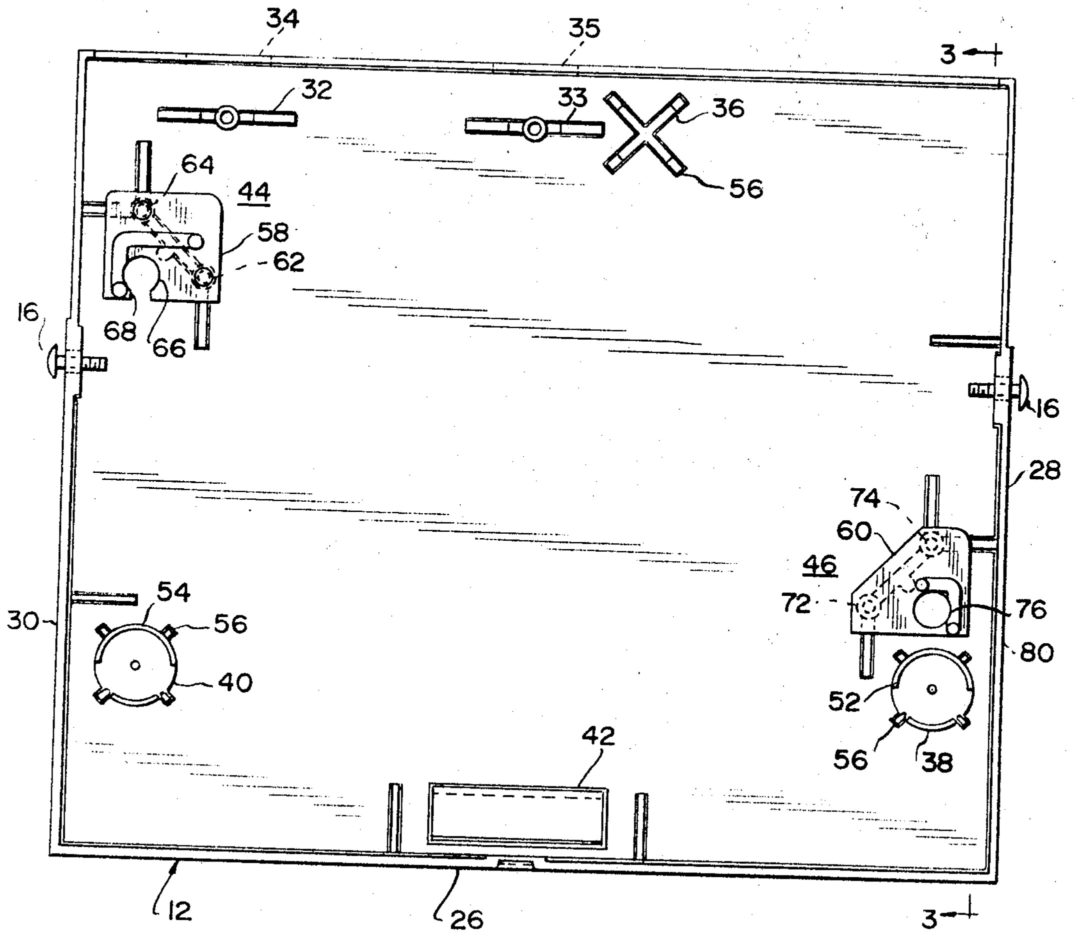
FIG. 2 is a plan view of the tray which houses the turntable chassis.
Figure 3:
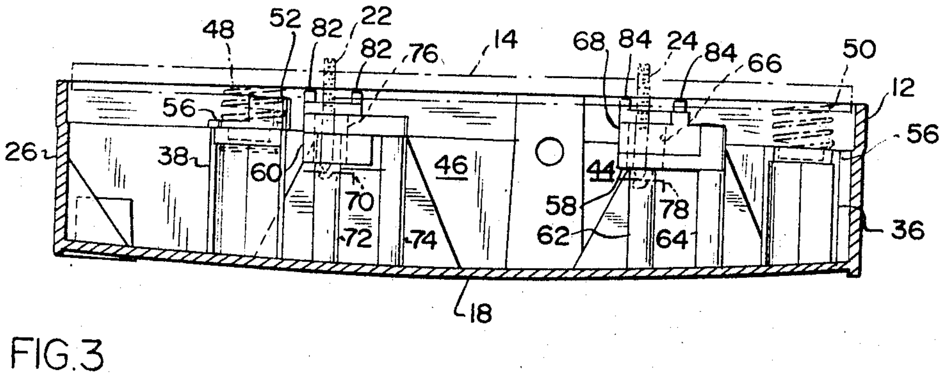
FIG. 3 is a vertical section taken along the line 3—3 in FIG. 2.

Reference is now made to FIGS. 2 through 4 to explain in detail the use of the present invention for mounting a chassis into a housing tray without the requirement of large openings on the housing underface. Mounting posts 32 and 33 provide means to secure the wires leading from the chassis 14 through openings 34 and 35, respectively, to the power supply and the electronic circuitry in the upper portion of cabinet 10. A finger access 42 in bottom face 18 provides means to conveniently position tray 12. Mounting posts 32 and 33, finger access 42, mounting assemblies 44 and 46 and spring supports 36, 38 and 40 are preferably integrally molded with plastic tray 12. Whereas prior art record players utilize a motorboard connected to a housing, the invention herein described may be a unitary plastic molded tray which is relatively inexpensive to manufacture and would not require additional procedures to fasten the motorboard to the housing.

Coil springs (two of which are shown in FIG. 3 by reference numerals 48 and 50) are connected to the underface of chassis 14 in such a manner as to be aligned with and disposed adjacent to spring supports or posts 38 and 36 respectively (a third coil spring not shown is retained by spring support 40). These supports may be of any desired configuration but are here shown to have an X-shape. In addition, a circular portion is connected to the top of each of the spring supports 38 and 40 with integrally connected semicircular lips 52 and 54 extending upward on the periphery of the circular portion. The coil springs are retained by their associated spring supports in order to shock mount the changer so that it is supported in a "floated" condition to render it substantially unaffected by external vibrations. Lips 52 and 54 are provided to prevent the chassis 14 from sliding off of the spring supports when the record changer is placed in its vertical storage position. Four projections 56 on each of the three spring supports extend slightly beyond the rest of the support and provide means to retain the springs and thereby restrict lateral movement of the chassis 14.

In order to secure the chassis 14 to tray 12, mounting assemblies 44 and 46 are utilized. Mounting assembly 44 comprises a pair of posts 62 and 64 connected to each other and to the sides and bottom of the tray by means of webbing in order to give additional strength to the assembly. An upper portion 58 is mounted on posts 62 and 64 and includes an aperture 66 and a rectangular opening 68 which serves as a guide for a fastener. Means to secure the chassis 14 to mounting assembly 44 include a threaded fastener 24 extending through a threaded hole in chassis 14 and a clip 78 connected to the end of the fastener such that the clip may be placed either in a vertical unlocked position or in horizontal locked position. Such a fastener and clip are known devices for this purpose and are commercially available as a unit. After clip 78 is placed in its horizontal position, threaded fastener 24 is inserted through rectangular opening 68 into aperture 66 so that clip 78 is under upper portion 58. Mounting assembly 46 includes an apertured upper portion 60 which is secured to posts 72 and 74. A clip 70 on the end of fastener 22 is placed in its vertical position before installation of the chassis so that after inserting fastener 22 into aperture 76, the mounting assembly will have the appearance of FIG. 4. After the chassis is in position the workmen would insert a tool through aperture 80 on side 28 of tray 12 and place the clip 70 in its horizontal position. Preferably a removable plug would be inserted into aperture 80 so as not to destroy the appearance of the record player. With clips 70 and 78 in their horizontal position, the chassis is secured to the tray.

For shipment, fasteners 22 and 24 would be screwed outwardly so that clips 70 and 78 bear against the underface of the upper portions 60 and 58 of mounting assemblies 46 and 44 respectively. In this manner the coil springs 48 and 50 (and a third coil spring retained by spring support 40 not shown) are compressed and chassis 14 is drawn tightly against projections 82 on mounting assembly 46 and projections 84 on mounting assembly 44 in order to reduce the possibility of damage to the chassis components during transit.

After shipment is completed, in order to place the record changer in operating condition, one would screw down the fasteners 22 and 24 so that the coil springs are uncompressed to thereby "float" the chassis 14. It is important that the heads of the fasteners be flush with the chassis surface in the floated condition so that the fasteners do not rattle during operation of the record player. Thus FIG. 3 shows a condition intermediate shipment and operation because in the former, clips 70 and 78 would be disposed against their associated upper portions while in the latter condition, fasteners 22 and 24 would be flush with chassis 14. When the record changer is being used, that is, when tray 12 is in its horizontal position, the clips 70 and 78 hang loosely below the upper portions of mounting assemblies 44 and 46 respecively so that the chassis is supported by the springs. When the record player is to be stored by placing the tray in its vertical position, two factors keep the chassis from disengaging the tray. First, coil spring 48 bears against semicircular lip 52 on spring support 38 and similarly a third coil spring, not shown, is supported by lip 54 on coil support 40 and secondly, fasteners 22 and 24 bear against the rear faces of their respective apertures. If the record player should fall backwards while the tray is in its vertical storage position, clips 70 and 78 bear against the underface of upper portions 60 and 58 respectively in order to keep the chassis from becoming disengaged from the mounting assemblies.

In prior mounting systems the chassis housing generally would have a motorboard in which case the clip on the end of each fastener would be placed in a vertical position for installation and positioned through the motorboard holes. A large access opening on the bottom of the chassis housing permits the workman to then place the clips in their horizontal position in order to lock the chassis in place. A motorboard for a portable record player would be impractical since getting a tool at the rear fastener-clip combination would require a hole on the bottom of tray 12 which would ruin the appearance of the entire unit. It will be noted, however, that use of the present invention allows the workmen to place the rear fastener-clip combination 24–78 in its locked position before installation so that no access hole is required. As for the front mounting assembly 46, an access aperture does not mar the appearance significantly because the aperture 80 is placed in the side rather than on the bottom where it would be more noticeable. However, even for this front mounting assembly a configuration similar to that used for mounting assembly 44 may be used in which case no aperture would be required. In such case, the workmen would place both fasteners 70 and 78 in their locked position before positioning the chassis onto the tray.

I claim:

1. In a phonograph record housing including a phonograph turntable tray pivotally mounted in the housing so that it may be placed in a vertical or horizontal position therein, the combination including, first support means including spring retaining means integral with the turntable tray, second support means having first and second upright supports, each said support having an upper mounting portion, said upper mounting portion in said first support including an aperture having a guide opening thereto, said upper mounting portion in said second support having an aperture therein, a record turntable device including a chassis for mounting the same in the turntable tray, spring means connected to the bottom of said chassis, threaded fastener means including first and second threaded fasteners extending through said chassis, and locking means including first and second clips threaded to said fasteners and being movable between a first open position and a second locked position, said turntable device being mounted in the turntable tray with said first threaded fastener being inserted through said guide opening and into said aperture of said upper mounting portion of said first support with said clip being in the second locked position, and said second threaded fastener being inserted through said aperture in said upper mounting portion of said second support with said clip being in the first opened position, said clip in said upper mounting portion of said second support being moved to said second locked position to prevent separation of said turntable device and said tray, and said spring means engaging said first support means so said chassis floatingly supported thereon, with said spring retaining means thereof restraining said chassis from moving laterally and preventing said record turntable from shifting when the tray is tilted to the vertical position.

2. The phonograph record housing of claim 1 wherein said first support means has projection means extending therefrom, and said spring retaining means has integral lip means extending upwardly therefrom, said spring retaining means being removably connected to said first support means and being supported thereby, said projection means restraining said spring retaining means from lateral movement, and wherein said turntable device is mounted in the turntable tray with said spring means engaging said spring retaining means so that said chassis is floatingly supported on said first support means with said lip means of said spring retaining means restraining said chassis from lateral movement, and said lip means extending upwardly from said spring retaining means engages said spring means to prevent said record turntable from shifting when the tray is tilted to the vertical position.

3. The phonograph record player of claim 1 wherein said threaded fastener means is adjustable to draw said chassis against said spring means and into engagement with said second support means for storage and transportation.

References Cited

UNITED STATES PATENTS

| | | | |
|---|---|---|---|
| 3,323,803 | 6/1967 | Pawlikowski et al. | 274—2 |
| 3,284,085 | 11/1966 | Zimmermann et al. | 274—39.1 |
| 2,777,902 | 1/1957 | Goldmark | 274—2 |

ROBERT B. HILL, *Primary Examiner.*

ROGER A. FIELDS, *Assistant Examiner.*